United States Patent
Ulla et al.

(10) Patent No.: US 6,882,524 B2
(45) Date of Patent: Apr. 19, 2005

(54) COMBINED MODULAR KEYBOARD AND TABLET PC PROTECTIVE COVER

(75) Inventors: Imran Ulla, Austin, TX (US); Jefferson Blake West, Austin, TX (US)

(73) Assignee: Motion Computing, Inc., Austin, TX (US)

( * ) Notice: Subject to any disclaimer, the term of this patent is extended or adjusted under 35 U.S.C. 154(b) by 167 days.

(21) Appl. No.: 10/423,284

(22) Filed: Apr. 25, 2003

(65) Prior Publication Data

US 2004/0212954 A1 Oct. 28, 2004

(51) Int. Cl.$^7$ ................................................ G06F 1/16
(52) U.S. Cl. ..................... 361/680; 361/681; 361/683; 345/169
(58) Field of Search .................. 361/679–683, 361/686, 725, 727; 345/169; 400/88, 682; 708/100; 248/279.1, 442.2, 917–923; 16/366–368, 352, 371; 235/145 R; 710/303

(56) References Cited

U.S. PATENT DOCUMENTS

| | | | | |
|---|---|---|---|---|
| 5,264,992 A | * | 11/1993 | Hogdahl et al. | 361/681 |
| 5,638,257 A | * | 6/1997 | Kumar et al. | 361/680 |
| 5,708,560 A | * | 1/1998 | Kumar et al. | 361/680 |
| 6,219,681 B1 | * | 4/2001 | Hawkins et al. | 708/100 |
| 6,700,775 B1 | * | 3/2004 | Chuang et al. | 361/680 |
| 2003/0142474 A1 | * | 7/2003 | Karidis et al. | 361/683 |
| 2004/0090742 A1 | * | 5/2004 | Son et al. | 361/686 |
| 2004/0195305 A1 | * | 10/2004 | Dotson | 235/145 R |

* cited by examiner

Primary Examiner—Michael Datskovsky
(74) Attorney, Agent, or Firm—Fortkort Grether & Kelton LLP

(57) ABSTRACT

A modular keyboard (12) for a tablet personal computer (10) provides a cover on an outer side (16) for covering the base unit (14) screen (18) and an inner side (46). A key array (44) for key-based data entry into the base unit (14) mounts integrally to the inner side (46). A back support (48) supports the base unit (14) in a raised position relative to the key array (44) and presents the base unit (14) for monitoring data entry from the key array (44). The back support (48) is retractable to a recess (90) that is substantially parallel to the inner side (46). Side support arms (54) cooperate with the back support (48) for supporting the base unit (14) and holding the base unit (14) securely relative to the back support (48). The side support arms (54) are retractable to a recessed position substantially parallel to the inner side (46). A bus connector (78) connects and communicates key-based data between the key array (44) and the base unit (14).

20 Claims, 4 Drawing Sheets

COMBINED MODULAR KEYBOARD AND TABLET PC PROTECTIVE COVER

TECHNICAL FIELD OF INVENTION

The present invention pertains generally to electrical computers and more particularly to modular tablet computer systems and keyboards for such systems.

BACKGROUND OF THE INVENTION

Personal computers have recently become very popular for a variety of uses ranging from home, office, engineering, sales, marketing, and military applications. Virtually every aspect of business, engineering and science utilizes some form of computer system on a daily basis. Since their introduction, personal computers have become increasingly compact while simultaneously becoming increasingly powerful. This progression of smaller and more powerful personal computers has reached the point that some personal computer manufacturers are providing a tablet personal computer, or "tablet PC."

The tablet PC is a fully functional personal computer, which may include a Microsoft Windows® operating system environment computer. The tablet PC not only is capable of running familiar productivity applications such as Microsoft's Word®, Excel® and PowerPoint®, but also offers the same rich connectivity to the Internet that a desktop or notebook PC provides.

In addition, the tablet PC adds the simplicity of pen and paper, because the user you can write on the screen for data input. The tablet PC is designed to work well with all types of input devices. However, those who find it most attractive are typically business computer users who spend some part of their day away from their desks. These users not only desire the use of the pen operating system, but also frequently have uses for which the traditional keyboard provides the best input device. For example, today's tablet PC provides effective handwriting recognition software. However, for longer documents and other applications, a keyboard provides the most efficient means for data input.

Unfortunately, using a keyboard requires the tablet PC user to carry the keyboard while moving from place to place. The need to carry along the keyboard, however small or compact, militates against the advantages of using the tablet PC. Accordingly, there is a need for a device that eliminates the requirement of carrying a keyboard in the mobile use tablet PC.

Now, even if a keyboard were carried, the mobile tablet PC user needs a practical way to view the tablet PC. This requires raising the base unit screen from the horizontal. So, a still further disadvantage exists associated with key-based data entry into the tablet PC of having to carry not only a separate keyboard, but also a separate stand or support for the tablet PC screen while the user's hands engage the keyboard. Accordingly, a further need exists for an efficient way to permit a tablet PC user to input data into the table PC via a keyboard, without the need to carry a separate stand that permits viewing the tablet PC during data entry.

SUMMARY OF THE INVENTION

In accordance with the present invention, a combined modular keyboard and tablet PC protective cover is provided that substantially eliminates or reduces the disadvantages and problems associated with prior keyboard and related input devices for tablet PCs and similar devices.

According to one aspect of the invention, there is provided a modular keyboard for a tablet personal computer that provides a cover on an outer side for covering the base unit screen and associated base unit control and input keys. A key array for key-based data entry into the base unit mounts integrally to the inner side. A back support supports the base unit in a raised position relative to the key array and presents the base unit for monitoring data entry from the key array. The back support is retractable to a recess that is substantially parallel to the inner side. Side support arms cooperate with the back support for supporting the base unit and holding base unit securely relative to the back support. The side support arms are retractable to a recessed position that is substantially parallel to the inner side. A bus connector connects and communicates key-based data between the key array and the base unit.

A technical advantage the present invention provides is a modular keyboard that is fully integrated into a snap-on cover of the associated tablet PC. Thus, the modular keyboard of the present invention effectively protects the base unit of the tablet PC, while providing a keyboard using well-known way of inputting data into the tablet PC.

Another technical advantage of the present invention is the providing of a modular keyboard for a tablet PC that requires no additional component or structure for the user to carry. By integrating the modular keyboard of the present invention into the tablet PC cover, the present invention takes advantage of the fact that the user will generally use a cover to protect the tablet PC base unit. Using the inner side of the cover for the keyboard, makes optimal use of the cover inner and outer surface area. Thus, the outer surface of the cover provides the protection for the tablet PC base unit. The inner cover provides a keyboard and an associated base unit stand.

Other technical advantages are readily apparent to one skilled in the art from the following figures, description, and claims.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein.

DETAILED DESCRIPTION OF PREFERRED EMBODIMENT

The preferred embodiment of the present invention and its advantages are best understood by referring to FIGS. 1 through 7 of the drawings, like numerals being used for like and corresponding parts of the various drawings.

Figure 1:
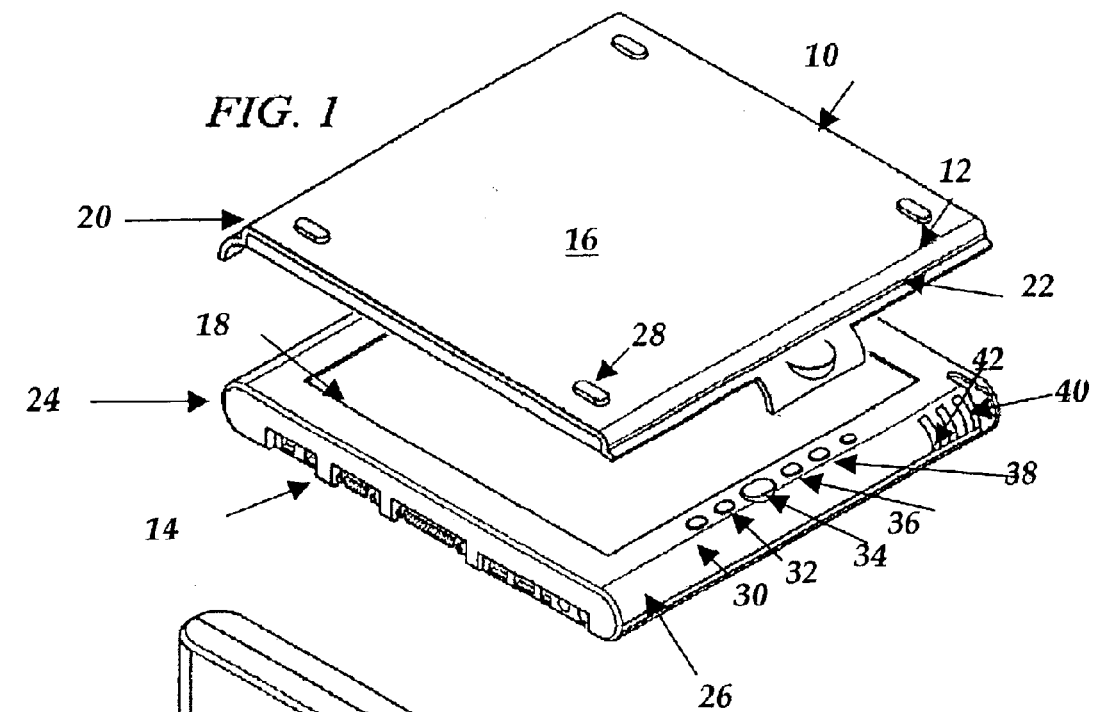
FIG. 1 shows a combined view of the modular keyboard and base unit forming the tablet PC of the present invention.

FIG. 1 shows tablet PC 10, which includes modular keyboard 12 and base unit 14. Modular keyboard 14 includes a hard protective outer side 16 for protecting screen 18 of base unit 14. Side clasps 20 and 22 form a friction fit to sides 24 and 26, respectively, of base unit 14. Rubber feet 28 on outer side 16 permit placing tablet PC 10 in an inverted position on a smooth surface to prevent slipping. Base unit 14 includes hot keys 30 and 32, scroll key 34, function key 36 and escape key 38. Pen holder 40 holds a pen-based input device or stylus adjacent LEDs 42. Modular keyboard 12 covers and protects from physical damage all of these keys and devices upon be secured to sides 24 and 26 of base unit 14.

Tablet PC 10 provides a fully functional computer system which can accommodate an alphanumeric keyboard and provides connections for various input and output signals. Specifically, tablet PC 10 provides connectors for a telephone jack, parallel port connections, serial port connections, display data connections, and a power connector. In one embodiment, tablet PC 10 may be modified to include a full computer address and data bus as well as a variety of peripheral components. Peripheral devices such as a disk drive and a numeric keypad may communicate with table PC 10. Tablet PC 10 also provides for data input and manipulation using a stylus or pen for control without the need for a keyboard. The stylus may be used for entering text and graphic information, as well as any of a number of computer control commands.

In the illustrated embodiment, modular keyboard 12 is partially formed from a plastic casing comparable in composition to the plastic of base unit 14. In an alternative embodiment, however, modular keyboard 12 may be formed, at least in part, from a softer foam rubber or plastic, such as that used in automobile dashboards, preferably with a hard plastic internal ribbing or frame. The softer casing could provide adequate structural support while absorbing more impact (from a drop from a table, for example) than a typical hard plastic casing. The softer foam may also provide improved comfort for a user holding the tablet in his or her hand or lap.

Figure 2:
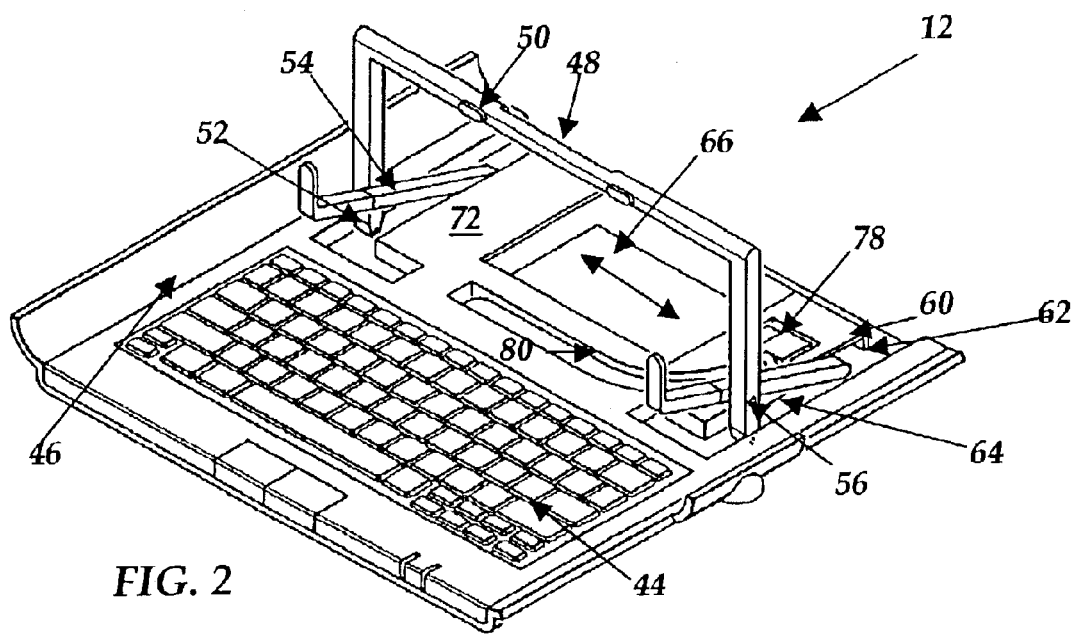
FIG. 2 provides an isometric view of the modular keyboard of the present invention.

FIG. 2 shows modular keyboard 12 inverted and in position for supporting base unit 14. Modular keyboard 12 includes key array 44, which is integrally attached to inner side 46 of modular keyboard 12. For supporting base unit 14, modular keyboard 12 includes back support 48, which includes rests 50 upon which base unit 14 may rest in a stationary position. Back support 48 pivots about joints 52, which are also integral to inner side 46 of modular keyboard 12. Side support arms 54 pivotally join back support 48 at joints 56 to provide generally vertical support for base unit 14, as base unit 14 rests on rest pads 50 of back support 48.

Key array 44 provides a standard QWERTY key array; however, other key arrangements may be used equally well. As well as providing desired alphanumeric input keys, key array 44 provides LEDs for indicating "CAP LOCK," and "NUM LOCK" or others functions or status under which key array 44 may be operating.

Side support arms 54 connect to or may be integrally formed with position bar 58. Note that the present embodiment uses two separate side support arms 54. However, a single support bar or more than two side support arms may be used as a side support mechanism within the scope of the invention. Position bar 58 may be moved laterally along guides 60. Moving position bar 58 changes the position of joints 56 in relation to joints 52. Thus, position bar 58 moving toward back ends 62 of guides 60 will cause joints 56 to move in a backward direction. This causes back support 48 to incline away from the vertical. Alternatively, moving position bar 58 in the direction of front ends 64 of guides 60, causes back support 48 to assume a more vertical position.

Figure 4:
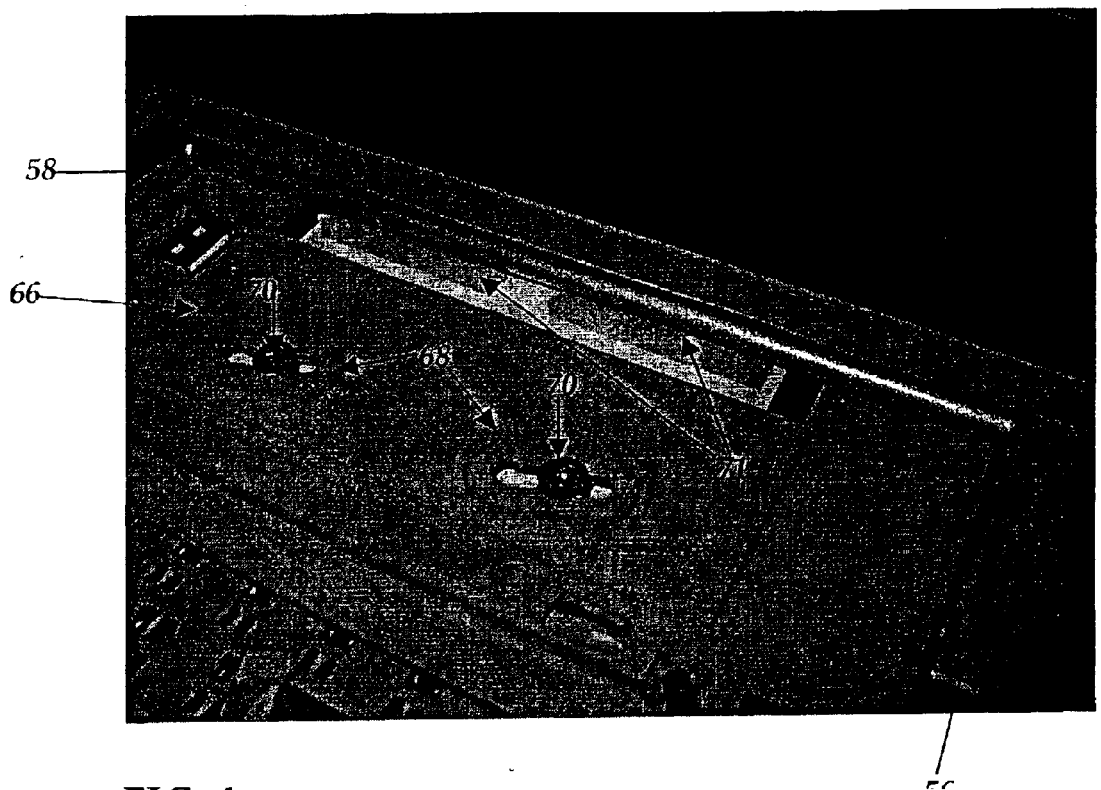
FIG. 4 illustrates the underside of the positioning plate of the present invention.

Position plate 66 controls the position of position bar 58 and includes a lateral cam that moves laterally for controlling the angle of back support 48. FIG. 4, below, more particularly describes the operation of the lateral cam for adjusting position plate 66.

USB cable 78 connects through keyboard base 72 to the electronic circuitry associated with key array 44. As a result, data input from key array 44 may feed into base unit 14. Moreover, base unit 14 may provide electrical power via USB cable 78 for operating circuitry associated with LEDs and key array 44 electronic circuitry. Recess 80 receives the disconnected USB cable 78. This causes USB cable 78 to assume a profile beneath the plane which keyboard base 72 establishes. Moreover, USB cable 78 is of a short length that, while permitting connection to an associated USB port (not shown) on connector side 82 of base unit 14, requires only minimal possible space and thickness in fitting USB cable 78 within the profile or thickness of keyboard base 72.

In an alternative embodiment of the present invention, instead of USB cable 78, there may be a wireless data connection between key array 44 and base unit 14. A wireless data connection may be established between key array 44 and the base unit 44 using an IrDA interface, although other wireless interfaces, including a radio frequency interface, are in accordance with the present invention. Other embodiments, however, may provide an alternate wired data connection among these components, such as a power/data wire connecting the key array to base unit 14.

Figure 3:
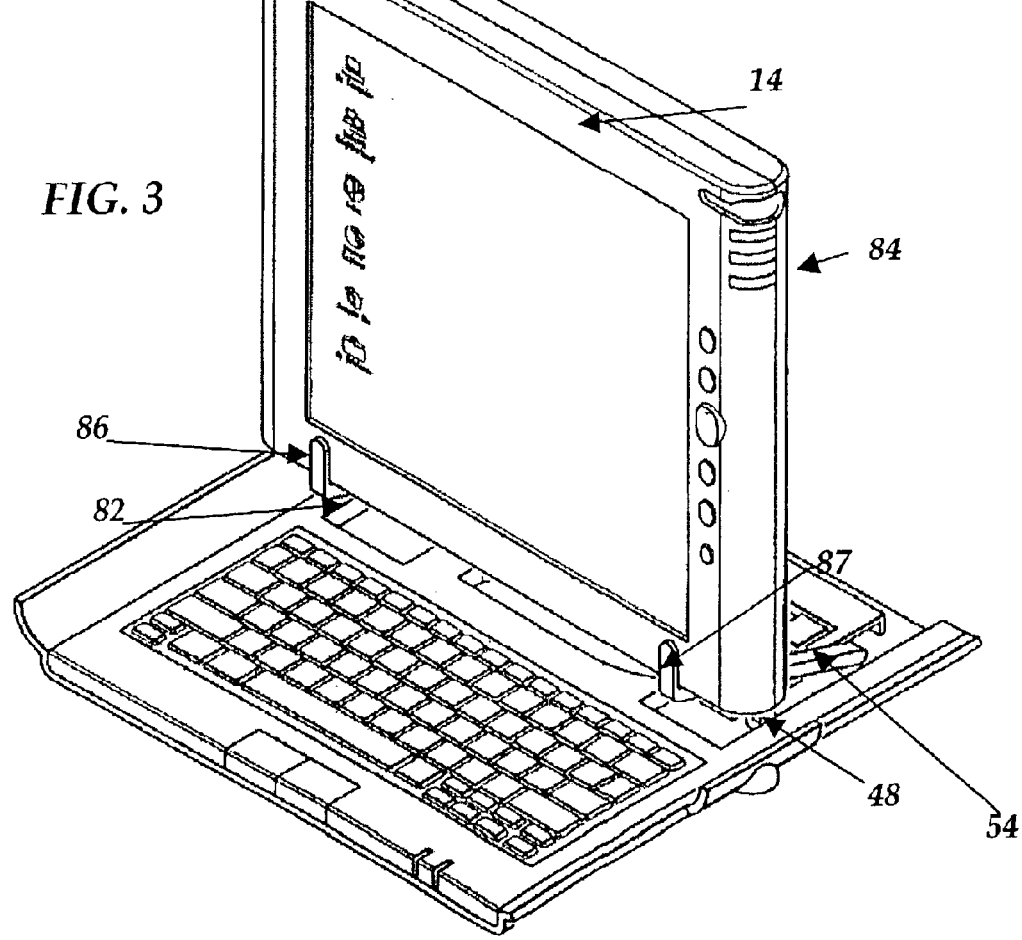
FIG. 3 shows the combination of the base unit and modular keyboard of the present invention.

FIG. 3 shows base unit 14 in position with support along back side 84 provided by back support 48, while side support arms 54 provide essentially vertical support. Side support arms 54 also include securing feet 86. Securing feet 86 include rubber covers 88, which not only facilitate a friction fit between securing feet 86 and back support 48, but also prevent or substantially reduce side movement of base unit 14 relative to modular keyboard 12. This results in a substantially rigid and secure combined base unit 14 and modular keyboard 12 forming tablet PC 10.

Securing feet 86 may, in one embodiment, be loaded with a torsion spring that causes them to automatically position vertically to secure base unit 14. Thus, once side support arms are raised, the associated torsion spring would snap securing feet 86 from a horizontal orientation a vertical orientation relative to inner side 46. For closing, securing feet are manually positioned back in the horizontal orientation, thereby loading the torsion spring and making securing feet 86 ready to snap to the vertical in the next use. Such a mechanism would prevent the placement of base unit 14 on side support arms 54 in a less safe position not using securing feet 86.

FIG. 4 provides an underside view of position plate 66 to show more specifically its operation. In particular, position plate includes lateral cam slots 68 which receive fasteners 70, which may be pins, screws or other fastening devices, for securing position plate 66 relative to keyboard base 72. Due to the angular disposition of lateral cam slots 68, shifting of positioning plate 68 from side to side causes positioning plate 66 to simultaneous translate from front to back. Because position bar 58 is integrally attached to position plate 66 at joints 71, such movement further causes position bar 58 to move front to back. The movement of position bar 58 changes the relative positions of joints 52 of back support 48 and joints 56 connecting back support 48 to side support arms 54. The result will be a change in the angular view of base unit 14 when resting on back support 48.

Figure 5:
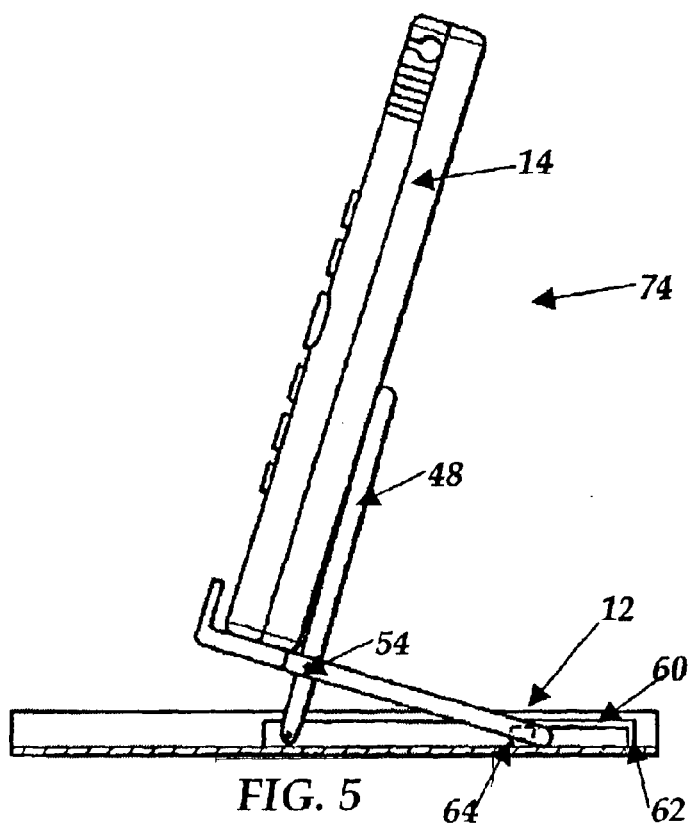
FIGS. 5 and 6 show two positions obtainable using the modular keyboard of the present invention.
Figure 6:
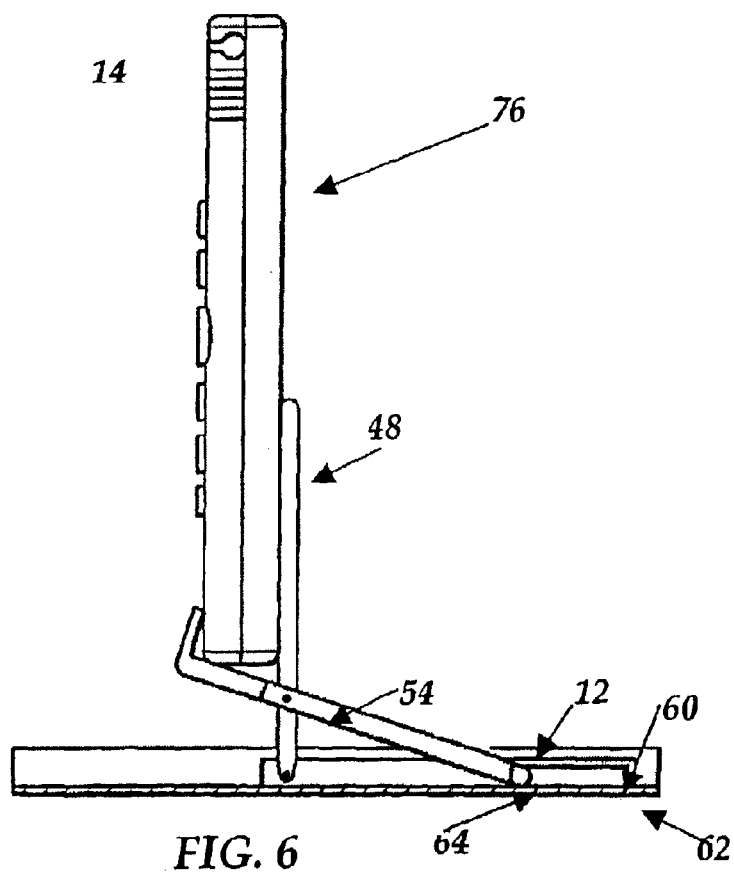

FIGS. 5 and 6 illustrate two possible positions that base unit 14 may assume to provide a fully adjustable angle of display to the user. Thus, FIG. 5 shows base unit 14 at an angle off of the vertical, whereas FIG. 6 depicts base unit 14 in a fully vertical position. Referring also briefly to FIG. 2, translating positioning plate 66 from a first position 74 to a second position 76 along lateral cam slots 68 moves position bar 58 to any desired position from back ends 62 to front end 64 of guides 60. This permits an essentially infinite number of angular positions that back support 48 may assume in presenting to the user screen 18 of base unit 14.

Although the preferred embodiment of the present invention provides lateral cam slots 68 for controlling the tilt angle of back support 48, other types of cam devices may be used. Moreover, an alternative embodiment of the present invention may provide for no adjustment at all, but simply provide that back support 48 alternate between a retracted position and a supporting position. For variable adjustment, the present invention may provide a rotating cam device that permits position adjustments for position of position bar 58. Alternatively, instead of providing a continuous type of position adjustment mechanism, an alternative embodiment may provide for a number of fixed or discrete variable positions that into which position bar 58 be positioned. All such varieties of positions and position establishing mechanisms are within the scope of the present invention.

Figure 7:
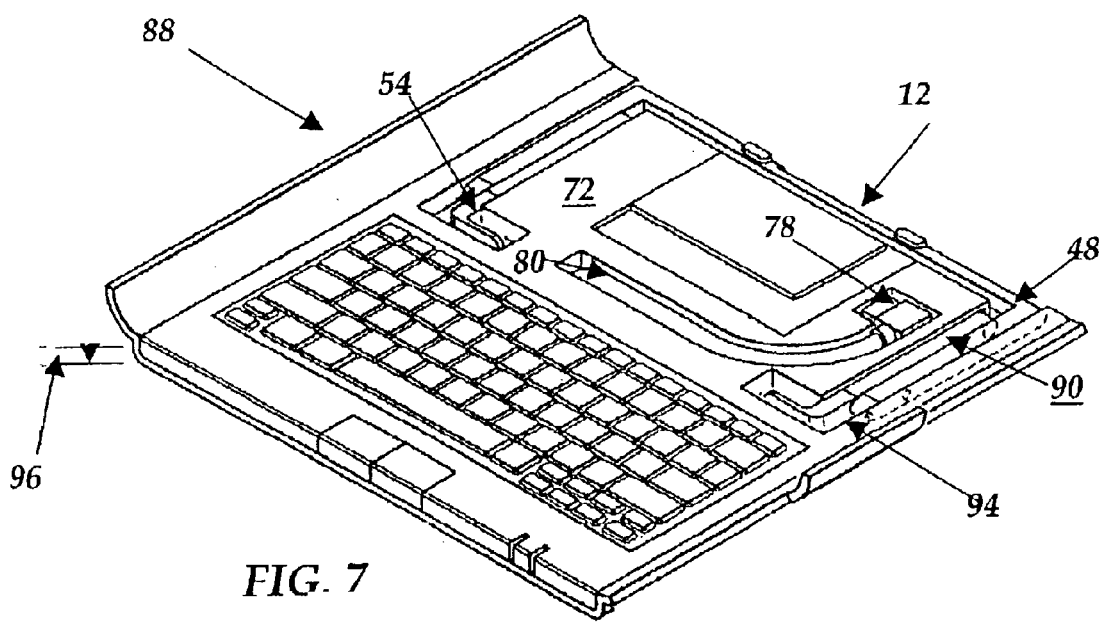
FIG. 7 depicts the modular keyboard of the present invention in a stowed configuration.

FIG. 7 illustrates a principal advantage of the present invention: the ability to provide the fully supported base unit 14 with modular keyboard 12 in a form factor having a minimal height when in a stowed position, which modular keyboard also provides a secure stand for supporting base unit 14. Thus, stowed configuration 88 depicts USB cable 78 stowed within recess 80 of keyboard base 72. Back support 48 stows in recess 90, into which position securing tab 92 assures no vertical movement out of the stowed position. Due to their own dimensions, side support arms 54 and position bar 58 stow within the perimeter which back support 48 defines within recess 90. Note also that securing feet 86 of side support arms 54 pivot to permit their lateral stowage within recess 94. Thus, securing feet 86 assume a stowed position not greater than the height of keyboard base 72.

In stowed configuration 88, the modular keyboard 12 height 96 equals the thickness of keyboard base 72. Consequently, modular keyboard 12 provides the combined benefit of serving as a protective cover for base unit 14 and as a standard data entry device using key array 44.

Figure 8:
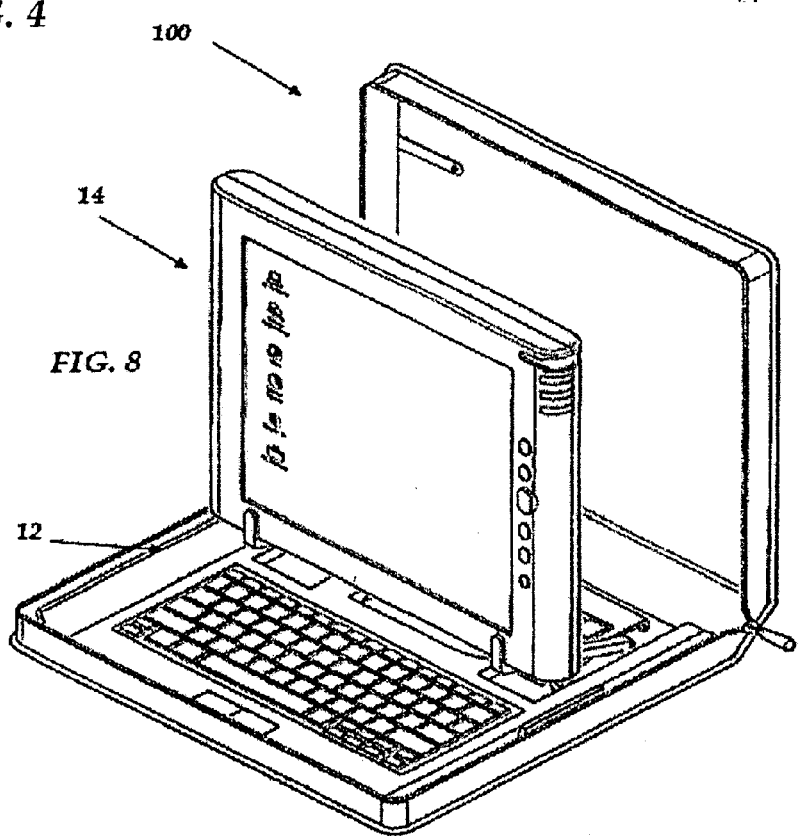
FIG. 8 illustrates one use of the modular keyboard of the present invention in a portfolio.

FIG. 8 illustrates a further embodiment of the present invention, whereby tablet PC 10 rests within portfolio 100. Portfolio 100 may, for example, provide a secure attachment to outer side 12 of modular keyboard 12. This would permit both the stowage of tablet PC 10 within portfolio 100, while tablet PC 10 immediately configurable to the supported positions such as FIGS. 3, 5 and 6 depict.

In summary, therefore, there is provided by the present invention, a modular keyboard for a tablet personal computer that provides a cover on an outer side for covering the base unit screen and associated control and input keys. A key array for key-based data entry into the base unit mounts integrally to the inner side. A back support supports the base unit in a raised position relative to the key array and presents the base unit for monitoring data entry from the key array. The back support is retractable into a recess that is substantially parallel to the inner side. Side support arms or a similar mechanism cooperates with the back support for supporting the base unit and holding base unit securely relative to the back support. The side support arms are retractable to a recessed position substantially parallel to the inner side. A bus connector connects and communicates key-based data between the key array and the base unit.

Accordingly, it is to be understood that the embodiments of the invention herein described are merely illustrative of the application of the principles of the invention. References made herein to details of the illustrated embodiments are not intended to limit the scope of the claims, which themselves recite those features regarded as essential to the invention.

We claim:

1. A modular keyboard for a tablet personal computer, comprising:
    a cover comprising an outer side for covering a tablet personal computer base unit and an inner side;
    a key array for key-based data entry into the base unit, said key array mounting integrally to said inner side;
    a back support for supporting said base unit in a raised position relative to said key array and presenting said base unit for monitoring data entry from said key array, said back support retractably associated with said inner side to retract into a recess that is substantially parallel to the inner side;
    a side support mechanism for cooperating with said back support for supporting said base unit, said side support mechanism retractably associated with said inner side for retracting into a recessed position substantially parallel to the inner side; and
    data input means for communicating key-based data between said key array and said base unit.

2. The modular keyboard of claim 1, further comprising a keyboard base, said keyboard base having a predetermined minimal thickness and further wherein said key array, said data input means, said back support, and said side support retract to a height not greater than approximately said predetermined minimal thickness.

3. The modular keyboard of claim 1, further comprising an adjustment mechanism associated with said back support for adjusting the angle of said base unit.

4. The modular keyboard of claim 1, further comprising at least one securing mechanism associated with said side support mechanism for securing the base unit relative to said back support.

5. The modular keyboard of claim 2, further comprising a spring loaded mechanism for automatically engaging said securing mechanism into a securing position upon raising said side support mechanism to support said base unit.

6. The modular keyboard of claim 1, wherein said data input means comprises a USB cable, said USB cable storable to a recessed slot.

7. The modular keyboard of claim 1, wherein said data input means comprises a wireless data communications mechanism.

8. A tablet personal computer having an integrated base unit and modular keyboard and stand unit, comprising:
    a base unit comprising a personal computer; and
    a modular keyboard and stand for the base unit, comprising:
        a cover comprising an outer side for covering a tablet personal computer base unit and an inner side;
        a key array for key-based data entry into the base unit, said key array mounting integrally to said inner side;

a back support for supporting said base unit in a raised position relative to said key array and presenting said base unit for monitoring data entry from said key array, said back support retractably associated with said inner side to retract into a recess that is substantially parallel to the inner side;

a side support mechanism for cooperating with said back support for supporting said base unit and holding base unit securely relative to said back support, said side support mechanism retractably associated with said inner side for retracting into a recessed position substantially parallel to the inner side; and data input means for communicating key-based data between said key array and said base unit.

9. The tablet personal computer of claim 8, further comprising a keyboard base, said keyboard base having a predetermined minimal thickness and further wherein said key array, said data input means, said back support, and said side support retract to a height not greater than approximately said predetermined minimal thickness.

10. The tablet personal computer of claim 8, further comprising an adjustment mechanism associated with said back support for adjusting the angle of said base unit.

11. The tablet personal computer of claim 8, further comprising at least one securing mechanism associated with said side support mechanism for securing the base unit relative to said back support.

12. The tablet personal computer of claim 11, further comprising a spring loaded mechanism for automatically engaging said securing mechanism into a securing position upon raising said side support mechanism to support said base unit.

13. The tablet personal computer of claim 8, wherein said data input means comprises a USB cable, said USB cable storable to a recessed slot.

14. tablet personal computer of claim 8, wherein said data input means comprises a wireless data communications mechanism.

15. A method for protecting and providing key-based data entry into a tablet personal computer, comprising the steps of:

covering the tablet personal computer for protecting a base unit of the tablet personal computer when the tablet personal computer is in a stowed configuration using a cover comprising an outer side for shielding the base unit and an inner side; and entering key-based data using a key array when the tablet personal computer is in an operating configuration, said key array mounting integrally to said inner side;

supporting said base unit in a raised position relative to said key array and presenting said base unit for monitoring data entry from said key array using a back support when the tablet personal computer is in a operating configuration, said back support retractably associated with said inner side to retract into a recess that is substantially parallel to the inner side when the tablet personal computer is in a stowed configuration;

supporting said base unit and holding base unit securely relative to said back support using a side support mechanism when the tablet personal computer is in a operating configuration, said side support mechanism retractably associated with said inner side for retracting into a recessed position substantially parallel to the inner side when the tablet personal computer is in a stowed configuration; and communicating key-based data between said key array and said base unit using a data input means when the tablet personal computer is in an operating configuration.

16. The method of claim 15, further comprising the step of stowing within a keyboard base having a predetermined minimal thickness said key array, said data input means, said back support, and said side support to a retracted height not greater than approximately said predetermined minimal thickness.

17. The method of claim 15, further comprising the step of adjusting the angle of said base unit using an adjustment mechanism associated with said back support.

18. The method of claim 15, further comprising the step of securing the base unit relative to said back support using at least one securing mechanism associated with said side support mechanism.

19. The method of claim 18, further comprising the step of automatically engaging said securing mechanism into a securing position upon raising said side support mechanism using a spring loaded mechanism.

20. The method of claim 15, further comprising the step of communicating data between said key array and said base unit using a USB cable, said USB cable storable to a recessed slot.

* * * * *